United States Patent
Senda

(10) Patent No.: US 8,522,045 B2
(45) Date of Patent: Aug. 27, 2013

(54) MULTI-FUNCTIONAL SYSTEM, SECURITY METHOD, SECURITY PROGRAM, AND STORAGE MEDIUM

(75) Inventor: Shigeya Senda, Shizuoka (JP)

(73) Assignee: Ricoh Company, Ltd., Tokyo (JP)

( * ) Notice: Subject to any disclaimer, the term of this patent is extended or adjusted under 35 U.S.C. 154(b) by 220 days.

(21) Appl. No.: 13/022,006

(22) Filed: Feb. 7, 2011

(65) Prior Publication Data

US 2011/0197066 A1   Aug. 11, 2011

(30) Foreign Application Priority Data

Feb. 8, 2010   (JP) ................................ 2010-024992

(51) Int. Cl.
*G06F 11/30*   (2006.01)
*G06F 12/14*   (2006.01)

(52) U.S. Cl.
USPC .......................................................... 713/189

(58) Field of Classification Search
USPC ...................................... 726/1–36; 713/189
See application file for complete search history.

(56) References Cited

U.S. PATENT DOCUMENTS

| | | | | |
|---|---|---|---|---|
| 2004/0101142 A1* | 5/2004 | Nasypny | ........................ | 380/278 |
| 2005/0254658 A1* | 11/2005 | Brown et al. | ................... | 380/286 |
| 2006/0210306 A1* | 9/2006 | Okamoto | ....................... | 399/119 |
| 2010/0313039 A1* | 12/2010 | Ignatius et al. | ................ | 713/189 |

FOREIGN PATENT DOCUMENTS

| | | |
|---|---|---|
| JP | 2006-501581 | 1/2006 |
| JP | 2007-213246 | 8/2007 |
| JP | 2007-257197 | 10/2007 |
| JP | 2007-259060 | 10/2007 |
| JP | 2008-500776 | 1/2008 |
| JP | 2008-226159 | 9/2008 |
| JP | 2008-226160 | 9/2008 |
| JP | 2008-234079 | 10/2008 |
| JP | 2008-234217 | 10/2008 |
| JP | 2008-234220 | 10/2008 |
| JP | 2009-104258 | 5/2009 |
| JP | 2009-124520 | 6/2009 |
| WO | WO2005/106620 | 11/2005 |

\* cited by examiner

*Primary Examiner* — Benjamin R Bruckart
*Assistant Examiner* — Nicholas Celani
(74) *Attorney, Agent, or Firm* — Oblon, Spivak, McClelland, Maier & Neustadt, L.L.P.

(57) ABSTRACT

A multi-functional system includes a main system, and sub-systems operated by sub-programs and the main system. The sub-systems includes a first memory storing a first public key, and a second memory storing an encrypted sub-program and second public key, a first communication controller transmitting the first public key for encrypted communication, a decryption unit decrypting the encrypted sub-program and second public key using an encryption key, and a second controller transmitting the decrypted second public key for encrypted communication. The main system includes a first public key, a second public key, a security device, and first and second communication controllers. The sub-systems execute a plurality of corresponding subprograms under the control of the main system.

6 Claims, 7 Drawing Sheets

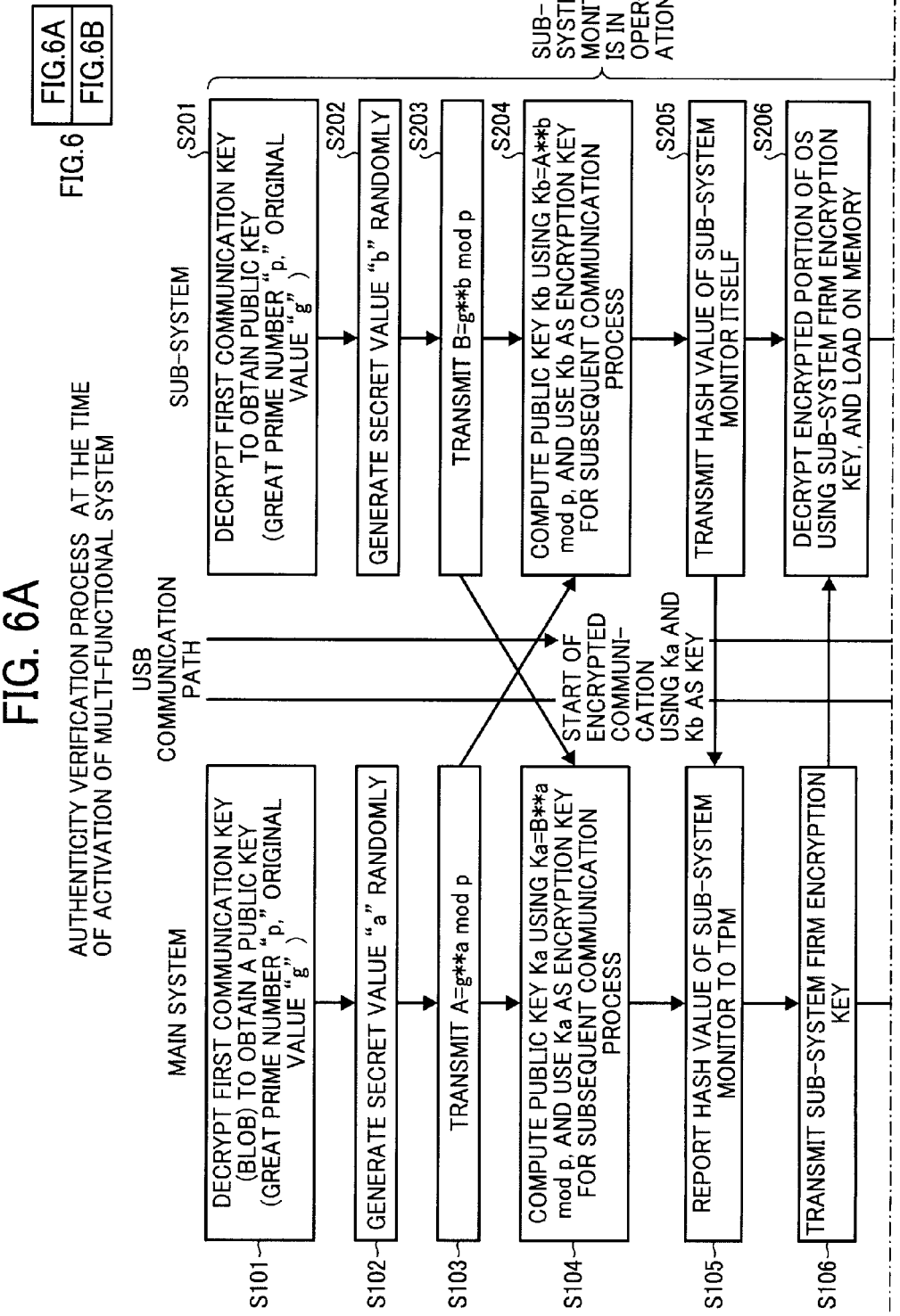

FIG. 7

DEPENDENCE RELATIONSHIP BETWEEN BLOB AND PCR

| | PCR 1 SYSTEM MONITOR HASH VALUE | PCR 2 SYSTEM OS HASH VALUE | PCR 3 SUB-SYSTEM MONITOR HASH VALUE | PCR 4 SUB-SYSTEM OS HASH VALUE |
|---|---|---|---|---|
| FIRST COMMUNICATION KEY (FOR SUB-SYSTEM COMMUNICATION) BLOB | ○ | ○ | | |
| SUB-SYSTEM FIRM ENCRYPTION KEY BLOB | ○ | ○ | ○ | |
| SECOND COMMUNICATION KEY (FOR SUB-SYSTEM COMMUNICATION) BLOB | ○ | ○ | ○ | ○ |

FIG. 8

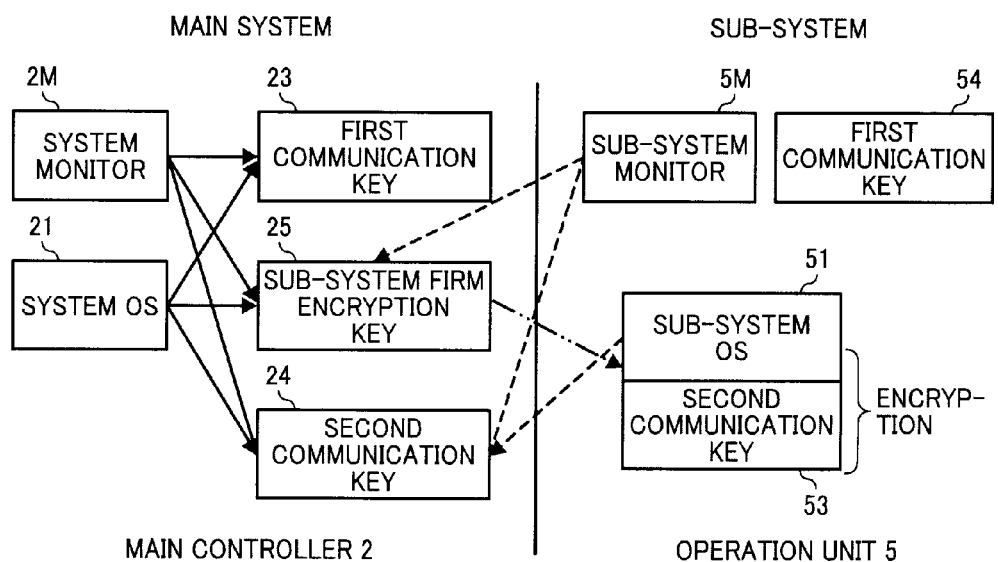

DATA RELATION BETWEEN MAIN SYSTEM AND SUB-SYSTEM

MULTI-FUNCTIONAL SYSTEM, SECURITY METHOD, SECURITY PROGRAM, AND STORAGE MEDIUM

CROSS-REFERENCE TO RELATED APPLICATIONS

This application claims priority to Japanese Patent Application No. 2010-024992, filed on Feb. 8, 2010 in the Japan Patent Office, which is incorporated by reference herein in its entirety.

BACKGROUND OF THE INVENTION

1. Field of the Invention

The present invention relates to a multi-functional system, a security method, a security program, and a storage medium, and more particularly, to a multi-functional system having a main system and a plurality of sub-systems, a security method, a security program, and a storage medium. The main system prevents intrusion by spoofing of the sub-system.

2. Description of the Background Art

With the spread of network environments, image processing apparatuses such as multi-functional apparatuses, copiers, printers, facsimile machines, and host units such as a plurality of computers may be connected to networks and the image processing apparatuses shared by the host units.

Further, the number of image processing apparatuses and other apparatuses using a plurality of resources has been increasing. For example, a multi-functional system or apparatus may be configured as follows: a main system is connected with a plurality of sub-systems such as an operating system, a sheet feed system, a scanning system, an image forming system, an optical scanning system, a communication system, a post-processing system or the like to configure a multi-functional system as a whole. Each of the sub-systems may be provided with a central processing unit (CPU) of its own to control the sub-system, all under the overall control of a CPU of the main system.

In such multi-functional systems, the sub-system can be easily connected to or disconnected from the main system, and protection of users' personal information stored in the multi-functional system becomes an important issue. For example, in such multi-functional systems, some external devices may pass themselves off as the genuine sub-system ("spoofing") to falsify software or steal information.

An operating system may be used not only for simply displaying information and operating keys but also conducting advanced or sophisticated image processing function such as a browser function. With market demand, such advanced functions may be implemented by installing and using a general-purpose operating system (OS). However, as the system becomes more advanced while continuing to use a general-purpose OS, countermeasures against attacks from external apparatuses such as falsification are necessary.

Conventionally, an authenticity verification process at the time of activation of one system may be conducted using a Trusted Platform Module (TPM) like that shown in FIG. 1, for example. As shown in FIG. 1, a hash value of a basic I/O system (BIOS) in a platform is verified by TPM, and if its authenticity is confirmed, a hash value of a basic package is verified by TPM. Further, a hash value of an application package is computed using the basic package, and if authenticity is verified by the TPM, the application package can be activated.

In a conventional system such as that disclosed in JP-2007-213246-A, when an application package stored in an external storage medium is to be executed, the application package is executed after verifying the authenticity of the application package. The external storage medium to store the application package also stores medium-specific identification information, and the application package is tied to the medium-specific identification information. A memory stores information indicating whether to allow or disallow an execution of the application package. Specifically, when the external storage medium is connected, it is determined whether the application package in the external storage medium can be executed or not based on the medium-specific identification information and the application package stored in the external storage medium, and the allow/disallow information stored in the memory. If determined to execute the application package, the application package can be executed. The authenticity of the application package stored in the external storage medium is verified to prevent intrusion into a multi-functional system when the application package is to be operated.

However, in the above described conventional technology, to ensure that the security of system is not compromised, the application package, the medium-specific identification information stored in the external storage medium, and the allow/disallow information stored in the memory of the main system are used to verify the authenticity of the application package to determine whether or not to allow execution of the application package. However, the security of the system in such multi-functional system may need to be enhanced further. Further, although the TPM is used for authenticity verification, the security of the multi-functional system in the above described conventional technology may need an enhancement.

As above described, the multi-functional system may include a main system connected to a plurality of sub-systems such as an operating system, an image forming system, a communication system, or the like, and each of the sub-systems can be connected or disconnected to the main system as required. As for such multi-functional system, unauthorized devices may spoof as an authorized sub-system, by which security may be undermined or breached in the form of an intrusion to the multi-functional system, information theft, information falsification, or the like. In the conventional technology, the security of the system may be breached by such spoofing and an intrusion to the system may occur.

SUMMARY

In one aspect of the present invention, a multi-functional system including a main system and a plurality of sub-systems is devised. The main system is operated by executing a main program. The plurality of sub-systems is operated by executing a plurality of corresponding sub-programs and under control of the main system, and each of the plurality of sub-systems detachably connected to the main system using a communication device. Each of the plurality of sub-systems includes a first public key non-volatile memory to store a first public key to be used for encrypted communication with the main system through the communication device for the first time after system activation; a second public key non-volatile memory to store a sub-program having a given encrypted portion and a second public key, the second public key encrypted and used for encrypted communication with the main system through the communication device after establishing initial encrypted communication with the main system; a first communication controller to transmit the first public key in the first public key non-volatile memory of the sub-system to the main system to establish encrypted communication with the main system through the communication device by sharing the first public key; a decryption unit to decrypt the sub-program having the encrypted portion and the encrypted second public key in the second public key non-volatile memory by using an encryption key received from the main system; and a second communication controller to transmit the second public key decrypted by the decryption unit to the main system to establish encrypted communication with the main system through the communication device by sharing the second public key. The main system includes a first public key non-volatile memory to store a first public key to be used for encrypted communication with the sub-system through the communication device; a second public key non-volatile memory to store the encryption key to decrypt the encrypted sub-program and the encrypted second public key in the sub-system and a second public key of the main system to be used for encrypted communication with the sub-system by sharing the second public key of the sub-system; a security device to protect authenticity of the first public key of the first public key non-volatile memory of the main system, authenticity of the encryption key and the second public key of the second public key non-volatile memory of the main system, and authenticity of the first public key and the second public key received from the sub-system through the communication device; a first communication controller to transmit the first public key in the first public key non-volatile memory of the main system to the sub-system when the authenticity of the first public key received from the sub-system is secured by the security device, the first communication controller establishing encrypted communication with the sub-system through the communication device by sharing the first public key of the main system and then transmitting the encryption key to the sub-system; and a second communication controller to transmit the second public key in the second public key non-volatile memory of the main system to the sub-system when the authenticity of the second public key received from the sub-system is secured by the security device, the second communication controller establishing encrypted communication with the sub-system through the communication device by sharing the second public key.

In another aspect of the present invention, a security method for a multi-functional system is devised, in which a main system operated by executing a main program and a plurality of sub-systems operated by executing a plurality of corresponding sub-programs under control of the main system, and each of the plurality of sub-systems detachably connected to the main system using a communication device. The method includes the steps of: in the sub-system, first communication control establishing encrypted communication with the main system through the communication device by sharing a first public key by transmitting the first public key to the main system, a first public key non-volatile memory storing the first public key to be used for the encrypted communication with the main system through the communication device initially after system activation; decrypting a sub-program having an encrypted portion and an encrypted second public key using an encryption key received from the main system, a second public key non-volatile memory storing the sub-program with encrypting the given portion of the sub-program and the second public key encrypted and used for encrypted communication with the main system through the communication device after establishing initial encrypted communication with the main system; second communication control establishing encrypted communication with the main system through the communication device by sharing the second public key by transmitting the second public key decrypted at the decrypting step to the main system; in the main system, security processing to protect authenticity of a first public key stored in the first public key non-volatile memory in the main system, wherein the first public key used to establish encrypted communication with the sub-system through the communication device, authenticity of the encryption key, stored in a second public key non-volatile memory of the main system, to decrypt the encrypted sub-program and the encrypted second public key in the sub-system, authenticity of the second public key, stored in the second public key non-volatile memory of the main system, the second public key of the main system establishing an encrypted communication with the sub-system by sharing the second public key of the main system and the second public key of the sub-system, and authenticity of the first public key and the second public key received from the sub-system through the communication device; first communication control transmitting the first public key in the first public key non-volatile memory of the main system to the sub-system when authenticity of the first public key received from the sub-system is secured by the security processing step, the first communication control establishing encrypted communication with the sub-system through the communication device by sharing the first public key and then transmitting the encryption key to the sub-system; and second communication control transmitting the second public key in the second public key non-volatile memory of the main system to the sub-system when authenticity of the second public key received from the sub-system is secured by the security process step, the second communication control establishing encrypted communication with the sub-system through the communication device by sharing the second public key.

In another aspect of the present invention, a computer-readable medium storing a security program is devised, the security program including instructions that when executed by a computer cause the computer to execute a security method for a multi-functional system configured with a main system operated by executing a main program and a plurality of sub-systems operated by executing a plurality of corresponding sub-programs under control of the main system, and each of the plurality of sub-systems detachably connected to the main system using a communication device. The method includes the steps of: in the sub-system, first communication control establishing an encrypted communication with the main system through the communication device by sharing a first public key by transmitting the first public key to the main system, a first public key non-volatile memory storing the first public key to be used for the encrypted communication with the main system through the communication device initially after system activation; decrypting a sub-program having an encrypted portion and an encrypted second public key using an encryption key received from the main system, a second public key non-volatile memory storing the sub-program with encrypting the given portion of the sub-program and the second public key encrypted and used for encrypted communication with the main system through the communication device after establishing initial encrypted communication with the main system; second communication control establishing encrypted communication with the main system through the communication device by sharing the second public key by transmitting the second public key decrypted at the decrypting step to the main system; in the main system, security processing to protect authenticity of a first public key stored in the first public key non-volatile memory in the main system, wherein the first public key is used to establish encrypted communication with the sub-system through the communication device, authenticity of the encryption key, stored in a second public key non-volatile memory of the main system, to decrypt the encrypted sub-program and the encrypted second public key in the sub-system, authenticity of the second public key, stored in the second public key non-volatile memory of the main system, the second public key of the main system establishing encrypted communication with the sub-system by sharing the second public key of the main system and the second public key of the sub-system, and authenticity of the first public key and the second public key received from the sub-system through the communication device; first communication control transmitting the first public key in the first public key non-volatile memory of the main system to the sub-system when authenticity of the first public key received from the sub-system is secured by the security process step, the first communication control establishing encrypted communication with the sub-system through the communication device by sharing the first public key and then transmitting the encryption key to the sub-system; and second communication control transmitting the second public key in the second public key non-volatile memory of the main system to the sub-system when authenticity of the second public key received from the sub-system is secured by the security process step, the second communication control establishing encrypted communication with the sub-system through the communication device by sharing the second public key.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIGS. 6A and 6B show a flowchart of steps in an authenticity verification process at the time of activation of the image forming apparatus;

FIG. 7 shows dependence relationship between BLOB keys and PCR registers; and

FIG. 8 shows dependence relationship of each piece of data in a main controller and an operation unit.

Figure 1:
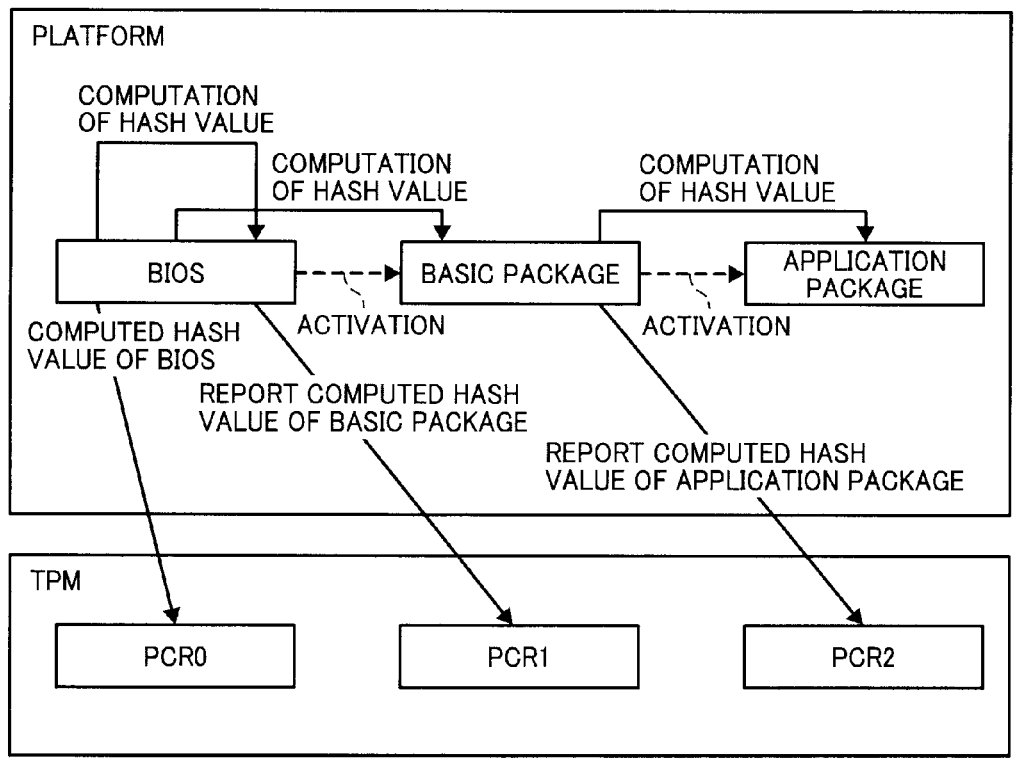
FIG. 1 shows a conventional authenticity verification process at the time of activation using TPM.

The accompanying drawings are intended to depict exemplary embodiments of the present invention and should not be interpreted to limit the scope thereof. The accompanying drawings are not to be considered as drawn to scale unless explicitly noted, and identical or similar reference numerals designate identical or similar components throughout the several views.

DETAILED DESCRIPTION OF EXEMPLARY EMBODIMENTS

A description is now given of exemplary embodiments of the present invention. It should be noted that although such terms as first, second, etc. may be used herein to describe various elements, components, regions, layers and/or sections, it should be understood that such elements, components, regions, layers and/or sections are not limited thereby because such terms are relative, that is, used only to distinguish one element, component, region, layer or section from another region, layer or section. Thus, for example, a first element, component, region, layer or section discussed below could be termed a second element, component, region, layer or section without departing from the teachings of the present invention.

In addition, it should be noted that the terminology used herein is for the purpose of describing particular embodiments only and is not intended to be limiting of the present invention. Thus, for example, as used herein, the singular forms "a", "an" and "the" are intended to include the plural forms as well, unless the context clearly indicates otherwise. Moreover, the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Furthermore, although in describing views shown in the drawings, specific terminology is employed for the sake of clarity, the present disclosure is not limited to the specific terminology so selected and it is to be understood that each specific element includes all technical equivalents that operate in a similar manner. Referring now to the drawings, a multi-functional system, a security method, a security program, and a storage medium according to example embodiment are described hereinafter.

Figure 2:
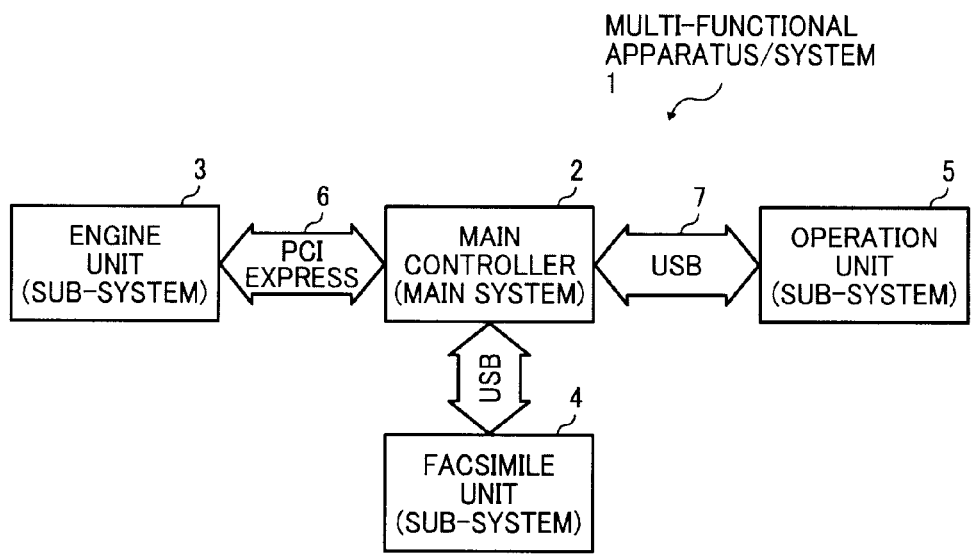
FIG. 2 shows an example block diagram of an image forming apparatus according to an example embodiment.

FIG. 2 shows a block diagram of a multi-functional system according to an example embodiment, in which the multi-functional system may be implemented as multi-functional apparatus, and security method, security program and storage medium according to an example embodiment may be applied with such system and/or apparatus.

As shown in FIG. 2, a multi-functional apparatus or system 1 (hereinafter multi-functional system 1) may include a main system and a sub-system. For example, the main system may include a main controller 2, and the sub-system may include one or more sub-systems such as an engine unit 3, a facsimile unit 4, and an operation unit 5. Further, the multi-functional system 1 may include a network communication unit, which can be connected to a network.

The main controller 2 is connected to the engine unit 3 using a PCIe6 (Peripheral Component Interconnect Express), which is a bus of high speed split transaction, in which a request and a response can be separated, and a next request can be issued without receiving a response. The main controller 2 is connected to the facsimile unit 4 and operation unit 5 using a universal serial bus (USB) 7. The PCIe6 and USB 7 may function as a communication device.

The engine unit 3 may include, for example, a scanning system and a printing system. In the scanning system, a document image is scanned in a main scanning direction and a sub-scanning direction with a given resolution level to output image data, and in the printing system, an image is output on a recording sheet using a given image forming method such as for example electrophotography based on the image data received from the main controller 2.

The facsimile unit 4 is connected to a communication line such as public line or the like that can conduct a facsimile communication. Under the control of the main controller 2, the facsimile unit 4 conducts a facsimile communication process. For example, the facsimile unit 4 receives facsimile data from a counterpart facsimile machine (receiving process), and transmits data, which is scanned by the scanning system of the engine unit 3 and processed with a given image processing, to a counterpart facsimile machine (transmitting process).

Figure 5:
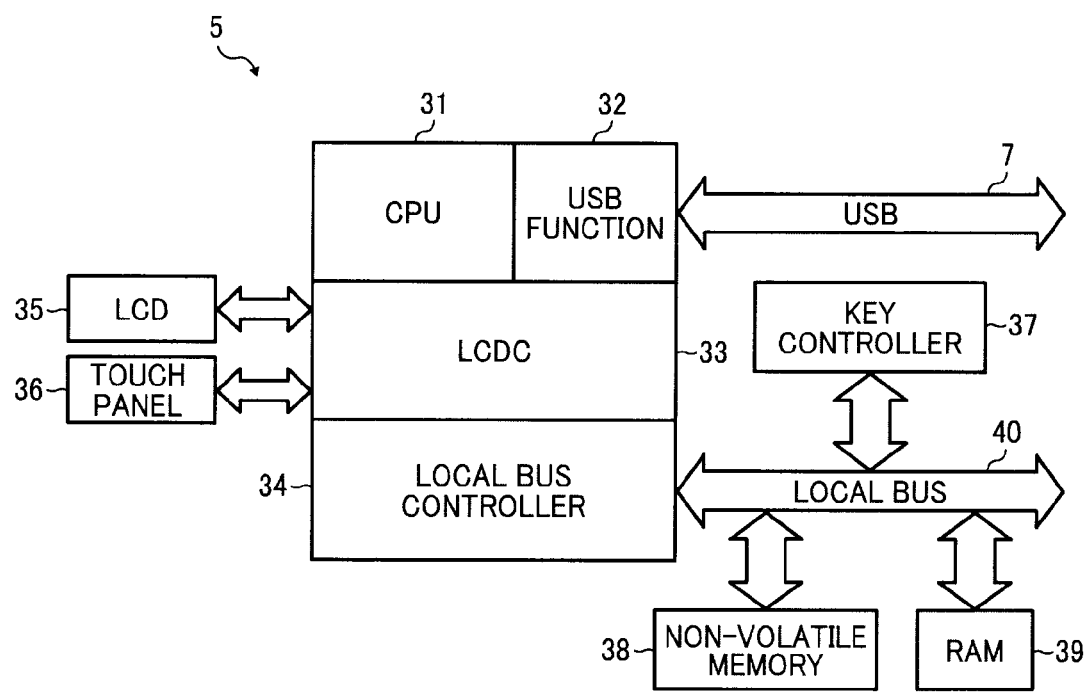
FIG. 5 shows an example block diagram of operation unit of FIG. 2.

The operation unit 5 may be, for example, a liquid crystal display having a touch panel or operation keys such as ten keys, clear/stop keys, a start key, a facsimile key, or the like. The liquid crystal display having a touch panel may display function keys, copying number, printing number, various information such as message reporting the status of the multi-functional system 1 such as for example, sheet jamming information in the multi-functional system 1, information indicating that the door cover is open, or the like. The operation unit 5 may employ, for example, a liquid crystal display (LCD) 35 and a touch panel 36 disposed on the LCD 35 as shown in FIG. 5.

Figure 3:
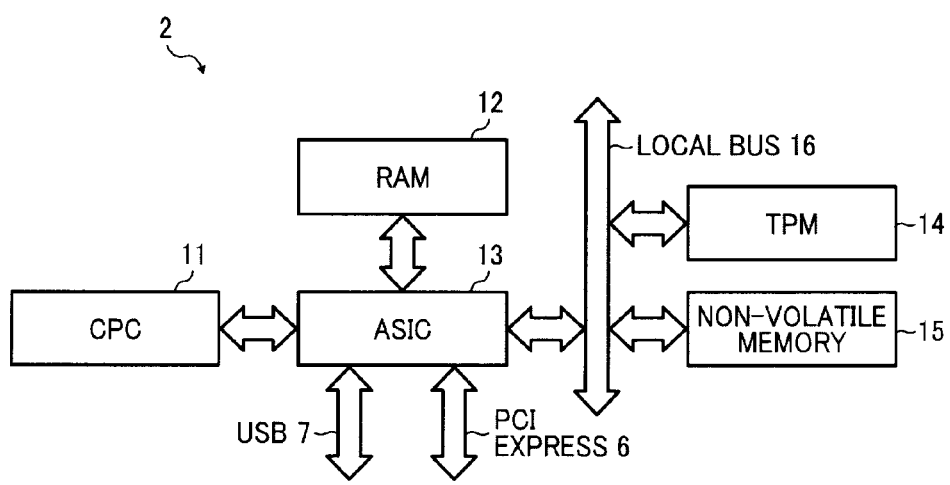
FIG. 3 shows an example block diagram of a main controller of FIG. 2.

As shown in FIG. 3, the main controller 2 may include a central processing unit (CPU) 11, a random access memory (RAM) 12, an application specific integrated circuit (ASIC) 13, a TPM 14, a non-volatile memory 15, and a local bus 16, in which the ASIC 13 may be connected with the PCIe 6 and the USB 7.

Figure 4:
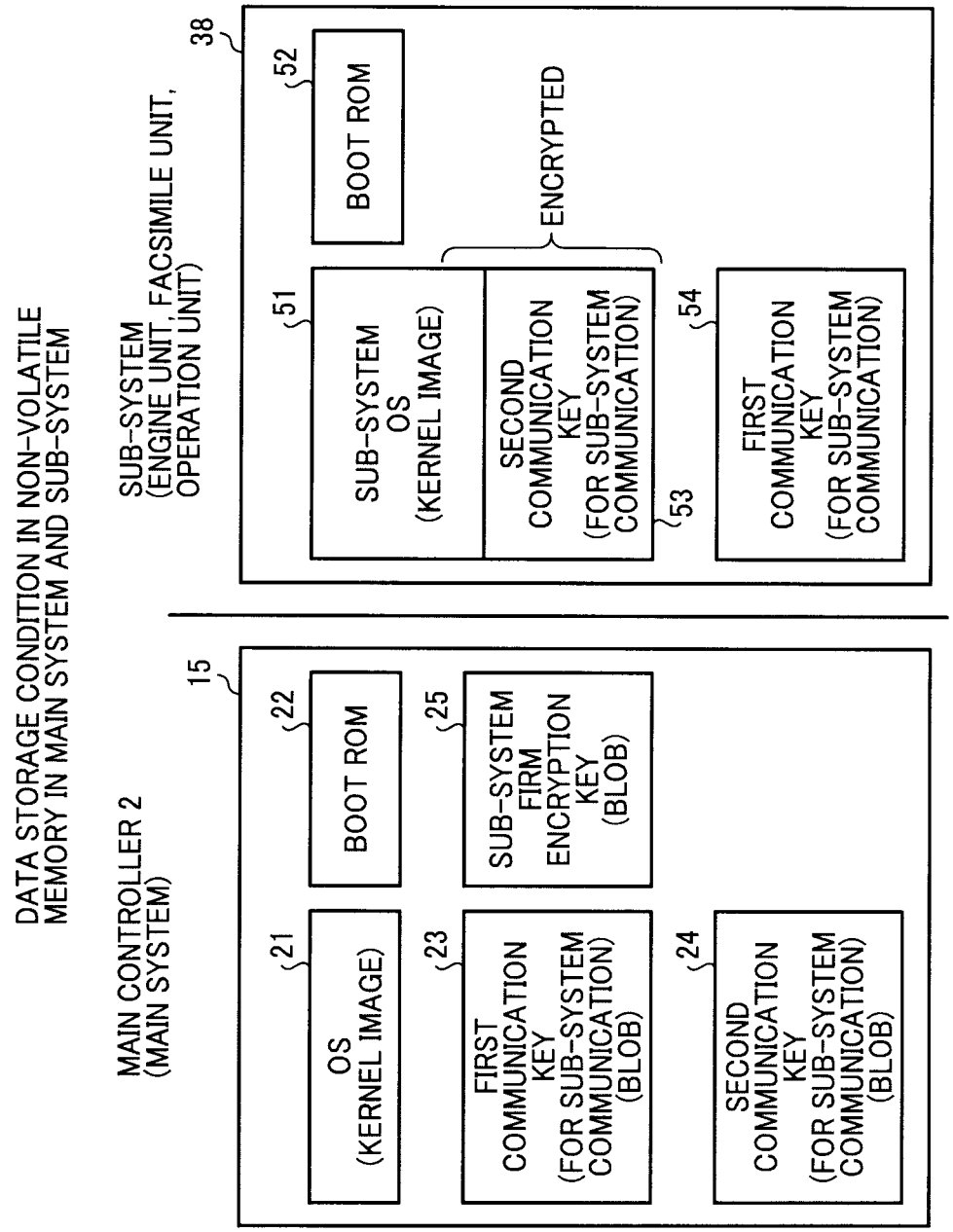
FIG. 4 shows an example data storage condition in a non-volatile memory of a main system and a sub-system.

The non-volatile memory 15 is a memory that can retain or store content in the multi-functional system 1 even when power supply to the multi-functional system 1 is OFF. The non-volatile memory 15 may be, for example, a flash read only memory (ROM), but is not limited thereto. The non-volatile memory 15 may be used as a first public key non-volatile memory and a second public key non-volatile memory. As shown in FIG. 4, the non-volatile memory 15 may store a system OS 21 having a kernel image for the multi-functional system 1, a BOOT ROM 22, a first communication key 23 (used as first public key) and a second communication key 24 (used as second public key), which are binary large object (BLOB) keys for a sub-system communication, and a sub-system firm encryption key 25, which is BLOB key (encrypted key), for example.

The system OS 21 is a main program of the multi-functional system 1. The BOOT ROM 22 stores a boot program to activate the system OS 21 at the time of activation of multi-functional system 1 (or multi-functional apparatus 1). Each of the first communication key 23 and the second communication key 24 is a communication key used for an encrypted communication encrypted by Diffie-Hellman key exchange. To secure a communication security in two stages, two communication keys 23 and 24 may be used.

Further, the non-volatile memory 15 in the main controller 2 stores the sub-system firm encryption key 25, which is used to decrypt encrypted data stored in a non-volatile memory 38 (see FIG. 4) of the sub-system such as engine unit 3, facsimile unit 4, and operation unit 5. The encrypted data in the non-volatile memory 38 of the sub-system (e.g., operation unit 5) may be a portion of a sub-system OS 51 required to activate a sub-system OS 51 having kernel image (see FIG. 4) of the sub-system (e.g., operation unit 5), and as a second communication key 53 used for an encrypted communication to be conducted later, and the sub-system firm encryption key 25 is an encryption key to decrypt the encrypted data of the non-volatile memory 38.

The TPM 14, which may be called as a security chip or security device, is a hardware chip including a CPU, a ROM, a RAM, a non-volatile memory, and a timer, and stores information required for activation verification process in the non-volatile memory.

The TPM 14 may include a function of generation, storage, and computation of public key and private key, in which important keys such as an endorsement key and a storage root key can be controlled. Further, the TPM 14 can safely store platform configuration information (measurement value of software) in a register of PCR (platform configuration registers) of the TPM 14, and also has a function of reporting platform configuration information. Such functions are referred to as RTS (root of trust for storage) and RTR (root of trust for reporting), respectively, in which integrity information (hash value) of software measured by RTM (root of trust for measurements) can be safely stored and reported.

Specifically, the TPM 14 stores and reports hash values shown in FIG. 7, for example, as information required for an activation verification process. For example, the TPM 14 stores a system monitor hash value to PCR 1, a system OS hash value to PCR 2, a sub-system monitor hash value to PCR 3, and a sub-system OS hash value to PCR 4. Such information may be stored in the non-volatile memory inside the TPM 14 when the multi-functional system 1 is shipped from a factory or when the multi-functional system 1 is activated for the first time.

The CPU 11 uses the system OS 21 stored in the non-volatile memory 15 using the RAM 12 as a working memory to control each unit in the multi-functional system 1. The CPU 11 can execute basic functions of the multi-functional system 1, and security method according to the example embodiment.

Under the control of the CPU 11, the ASIC 13 transmits and receives data and signals with the sub-system such as engine unit 3, facsimile unit 4, and operation unit 5, and conducts image processing required for image data. The CPU 11 and ASIC 13 may function as a first communication controller and a second communication controller as a whole.

As shown in FIG. 5, the operation unit 5 may include a CPU 31, a USB function 32, a liquid crystal display controller (LCDC) 33, a local bus controller 34, a liquid crystal display (LCD) 35, a touch panel 36, a key controller 37, a non-volatile memory 38, a RAM 39, and a local bus 40, for example.

The USB function 32 is connected to the USB 7, which is connected to the ASIC 13 of the main controller 2, and transmits and receives data and signals with the main controller 2 under the control of the CPU 31.

The non-volatile memory 38 is a memory that can retain stored content even when a power supply to the multi-functional system 1 is OFF, and more particularly even when a power supply to the operation unit 5 is OFF, and the non-volatile memory 38 may be, for example, flash read only memory (ROM), but not limited thereto. The non-volatile memory 38 may be used as a first public key non-volatile memory and a second public key non-volatile memory. As shown in FIG. 4, the non-volatile memory 38 may store a system OS 51 having a kernel image for the sub-system such as operation unit 5, a BOOT ROM 52, a first communication key 54 (used as first public key) and a second communication key 53 (used as second public key), which is BLOB (binary large object) key for a sub-system communication, and a sub-system firm encryption key 25, which is BLOB key (encrypted key), for example. Further, the first communication key 54 is stored in a given area of the non-volatile memory 38, which cannot be re-written easily.

The sub-system OS 51 is an operation program of the sub-system such as operation unit 5. The BOOT ROM 52 stores a boot program to activate the sub-system OS 51 at the time of activation of the sub-system such as operation unit 5. Each of the first communication key 54 and the second communication key 53 is a communication key used for an encrypted communication encrypted by Diffie-Hellman key exchange, and used as a communication key which is used for an encrypted communication with the main controller 2. To secure a communication security in two stages, two communication keys 53 and 54 may be used.

Further, the non-volatile memory 38 stores the second communication key 53, which is required to activate the subsystem OS 51 and is used for a communication to be conducted later, wherein the second communication key 53 is encrypted data encrypted by a given encryption method, and stored in the non-volatile memory 38. To be described later, the CPU 31 of the sub-system such as operation unit 5 decrypts the encrypted data stored in the non-volatile memory 38 using the sub-system firm encryption key 25 received from the main controller 2.

The CPU 31, which may be used as decryption unit, uses the sub-system OS 51 stored in the non-volatile memory 38 using the RAM 39 as a working memory to control each unit in the sub-system such as operation unit 5, by which given processes for the operation unit 5 can be processed, and a security method according to example embodiment can be executed. The CPU 31 and USB function 32 may function as a first communication controller and a second communication controller as a whole.

Under the control of the CPU 31, the LCDC 33 displays data or information transmitted from the main controller 2 and/or function buttons on the LCD 35, and detects a touch operation conducted on the touch panel 36 and transmits a detection signal to the main controller 2.

The key controller 37 detects an operation at the hard keys of the operation unit 5, and transmits a detection signal to the main controller 2 via the USB function 32.

The local bus controller 34 controls communication between the devices connected to the local bus 40. For example, the local bus controller 34 controls communication between the key controller 37, the non-volatile memory 38, the RAM 39, and the CPU 31 via the local bus 40.

Further, as for the multi-functional system 1, a security program used for executing a security method may be a computer-readable program, which is read from a storage unit or memory such as ROM and/or the non-volatile memory 15. For example, a storage device, which can store computer-readable program, may be provided as a flexible disk, a compact disk read only memory (CD-ROM), a compact disc rewritable (CD-RW), a digital versatile disk read only memory (DVD-ROM), DVD recording only/rewritable (DVD-R/RW), electrically erasable and programmable read only memory (EEPROM), erasable programmable read only memory (EPROM), a memory card, a memory chip, a secure digital (SD) card, a mini disk (MD), a magneto optical disc (MO), magnetic tape, hard disk in a server, or the like, but not limited these. Further, a computer-readable program can be downloaded to a particular computer (e.g., personal computer) via a network such as the Internet, or a computer-readable program can be installed to a particular computer from the above-mentioned storage device, by which the particular computer may be used for the system or apparatus according to example embodiments, for example.

By reading and loading a security program for executing security method to a ROM, the non-volatile memory 15 or the like, the multi-functional system can execute a security method to prevent a spoofing to be described later.

The security program may be a legacy programming language or an object-oriented programming language such as assembler, C, C++, C#, Java (registered trademark), which is a computer-readable program that can be downloaded to a particular computer (e.g., personal computer) via a network, or a computer-readable program that can be installed to a particular computer from the above-mentioned storage device, by which the particular computer may be used for the multi-functional system or apparatus according to example embodiment, for example.

A description is given to processing in an example embodiment. At the time of activation of the multi-functional system 1, a portion of the sub-system OS 51 of a plurality of sub-systems connected to the main controller 2 (main system) is encrypted. The sub-system firm encryption key 25 used to decrypt the encrypted portion is stored in the non-volatile memory 15 of the main controller 2 as a BLOB key.

After confirming the authenticity of the sub-system, the sub-system firm encryption key 25 in the multi-functional system 1 is transmitted to the operation unit 5, by which an intrusion and/or falsification by spoofing of the operation unit 5 (or sub-system) can be prevented. Further, as for the multi-functional system 1, the TPM 14 of the main controller 2 mainly controls or manages root of trust of authenticity.

Further, although the operation unit 5 may be explained as the sub-system in this disclosure, other sub-system such as engine unit 3, facsimile unit 4, or the like can be similarly operated.

The operation unit 5 (hereinafter, sub-system, as required) is connected to the main controller 2 (hereinafter, main system, as required) using the USB 7. In such environment, one device, which is not the operation unit 5, may spoof as the operation unit 5 by connecting the one device using the USB 7, and then the one device may act like the operation unit 5 to conduct an intrusion, data falsification/theft, for example.

Figure 6B:
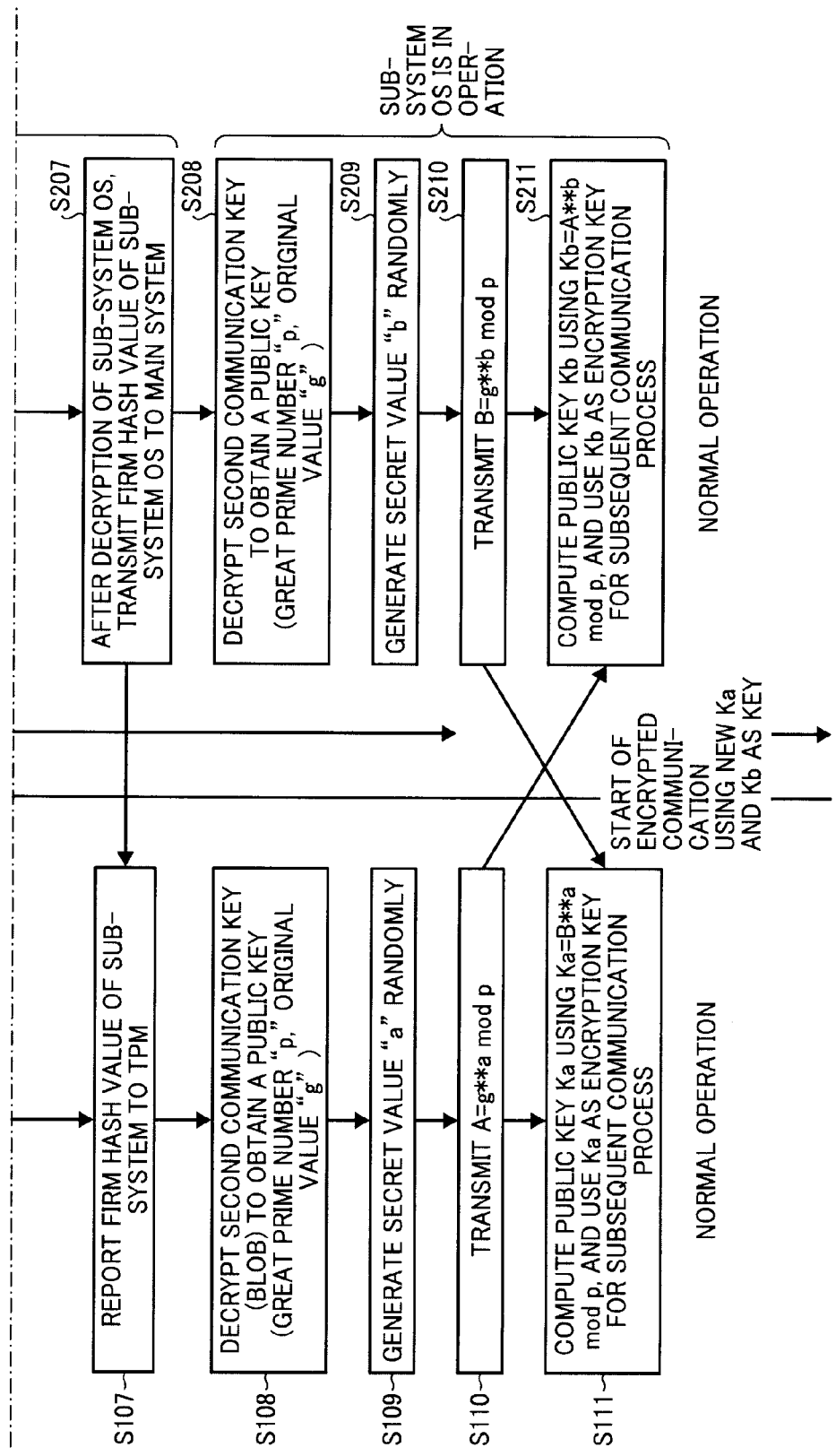

The multi-functional system 1 can prevent an intrusion by spoofing of the sub-system by executing the authenticity verification process at the time of activation as shown in FIGS. 6A and 6B.

When a power supply to the multi-functional system 1 is set to ON, the main controller 2 (main-system) starts to activate a boot program in the BOOT ROM 22 to activate the system OS 21, and further, in the operation unit 5 (sub-system), the BOOT ROM 52 is activated to activate the sub-system OS 51.

When the system OS 21 is activated, the main controller 2 reads out the first communication key 23, stored in the non-volatile memory 15 as BLOB key, and decrypts the first communication key 23 to obtain a public key while setting great prime number "p" and original value "g" (step S101). Then, a secret value "a" is generated randomly (step S102). Further, data A to be used as a public key is computed by using the secret value "a", the great prime number "p," and the original value "g" by computing A=ga mod p, and then the data A is transmitted to the operation unit 5 used as the sub-system (step S103**).

On one hand, when a sub-system monitor 5M is activated in the operation unit 5 (i.e., sub-system), the sub-system monitor 5M reads out the first communication key 54, stored in the non-volatile memory 38, and decrypts the first communication key 54 to obtain a public key while setting great prime number "p" and original value "g" (step S201). Then, a secret value "b" is generated randomly (step S202). Further, data B to be used as a public key is computed by using the secret value "b", great prime number "p" and the original value "g" by computing B=gb mod p, and then the data B is transmitted to the main controller 2 used as the main system (step S203**).

The main controller 2 computes a public key Ka using the data B received from the operation unit 5 using the following formula (1), and uses the public key Ka as an encryption key for subsequent communication process (step S104), and waits a transmission of a hash value from the sub-system.

$$Ka=B**a \bmod p \tag{1}$$

Similarly, the operation unit 5 computes a public key Kb using the data A received from the main controller 2 using the following formula (2), and uses the public key Kb as encryption key for subsequent communication process (step S204).

$$Kb = A^{**}b \bmod p \quad (2)$$

Diffie-Hellman key exchange can be established when the main controller 2 (main system) and the operation unit 5 (sub-system) obtain the above described encryption key, then the main controller 2 and the operation unit 5 can establish an encrypted communication using the public keys Ka and Kb as encryption key for subsequent communication process.

When the operation unit 5 computes the public key Kb, a hash value of the sub-system monitor 5M itself is transmitted to the main controller 2 (main system) using encrypted communication (step S205). The main controller 2 reports the transmitted hash value to the TPM 14 (step S105). If authenticity is confirmed, the sub-system firm encryption key 25 stored in the non-volatile memory 15 as BLOB key is decrypted, and transmitted to the operation unit 5 (sub-system) using an encrypted communication (step S106).

In the operation unit 5, when the sub-system firm encryption key 25 is transmitted from the main controller 2, an encrypted portion of the sub-system OS 51 is decrypted by using the sub-system firm encryption key 25, and loaded on a memory (step S206). After decryption at the sub-system OS 51, a hash value (sub-system firm hash value) is transmitted to the main controller 2 (main system) using an encrypted communication (step S207).

When the operation unit 5 transmits the sub-system firm hash value to the main controller 2, the sub-system firm hash value is reported to the TPM 14, and if authenticity is secured (step S107), the second communication key 24 stored in the non-volatile memory 15 as BLOB key is read out and decrypted to obtain a public key while setting the great prime number "p" and original value "g" (step S108). Then, the secret value "a" is generated randomly (step S109). Further, data A to be used as a public key is computed by using the secret value "a", great prime number "p" and original value "g" by computing $A = g^{**}a \bmod p$, and then the data A is transmitted to the operation unit 5 (sub-system) (step S110).

After the operation unit 5 transmits the firm hash value at step S207, the second communication key 53 included in an encryption area of the firm OS 51 is decrypted to obtain a public key while setting great prime number "p" and original value "g" (step S208). Then, the secret value "b" generated randomly (step S209). Further, data B to be used as a public key is computed by using the secret value "b", great prime number "p" and original value "g" by computing $B = g^{**}b \bmod p$, and then the data B is transmitted to the main controller 2 (main system) using an encrypted communication (step S210).

The main controller 2 computes the public key Ka using the data B received from the operation unit 5 (sub-system) by using the above described formula (1), and uses the public key Ka as encryption key for subsequent communication process (step S111), and then an encrypted communication starts.

Similarly, the operation unit 5 computes the public key Kb using the data A received from the main controller 2 by using the above described formula (2), and uses the public key Kb as encryption key for subsequent communication process (step S211), and then an encrypted communication starts.

As shown in FIGS. 6A and 6B, in the operation unit 5 (sub-system), the sub-system monitor 5M (see FIG. 8) is in operation from steps S201 to S207, and the sub-system OS 51 is in operation from step S208 and subsequent steps.

As for the multi-functional system 1, a dependence relationship between the first communication key 23, the sub-system firm encryption key 25, and the second communication key 24 may be set as shown in FIG. 7. FIG. 7 shows a dependence relationship between the first communication key 23, the sub-system firm encryption key 25, and the second communication key 24 stored in the non-volatile memory 15 of the main controller 2 as BLOB key and PCRs in the TPM 14.

The first communication key 23 (BLOB key) cannot be decrypted unless a system monitor hash value of PCR 1 and a system OS hash value of PCR 2 are collectively set. Further, the sub-system firm encryption key 25 (BLOB key) cannot be decrypted unless a system monitor hash value of PCR 1, a system OS hash value of PCR 2, and a sub-system monitor hash value of PCR 3 are collectively set. Further, the second communication key 24 (BLOB key) cannot be decrypted unless a system monitor hash value of PCR 1, a system OS hash value of PCR 2, a sub-system monitor hash value of PCR 3, and a sub-system OS hash value of the PCR 4 are collectively set.

As similar to a normal system boot, in the operation unit 5 (used as sub-system), the sub-system monitor 5M is activated at first from the BOOT ROM 52, and after conducting the hardware initialization of the CPU 31 or the like, the sub-system OS 51 is loaded. However, in the operation unit 5 connected to the multi-functional system 1, to enhance and safety of the USB 7 used as a communication path and to enhance safety of system operation, a portion of data of the sub-system OS 51 and the second communication key 53 on the non-volatile memory 38 are encrypted.

To decrypt the encrypted portion of sub-system OS 51 and the second communication key 53, the sub-system monitor 5M determines a key for a communication path with the main controller 2 using Diffie-Hellman key exchange to establish an encrypted communication, and the sub-system monitor 5M requests the sub-system firm encryption key 25, stored as BLOB key in the non-volatile memory 15 in the main controller 2.

To safely obtain the sub-system firm encryption key 25 from the main controller 2, the non-volatile memory 38 stores the first communication key 54 used for establishing an encrypted communication with the main controller 2. Based on the Diffie-Hellman key exchange using the first communication key 23 in the main controller 2 and the first communication key 54 in the operation unit 5, the communication keys Ka and Kb can be generated from a randomly selected value selected by each of the main controller 2 and the operation unit 5, and an encrypted communication can be established using the communication keys Ka and Kb.

Then, the operation unit 5 (sub-system) transmits a monitor hash value to the main controller 2, and the main controller 2 registers the monitor hash value in PCR register in the TPM 14.

The main controller 2 reads out the sub-system firm encryption key 25 from the non-volatile memory 15 and decrypts the sub-system firm encryption key 25 used for decrypting the sub-system OS 51 and the second communication key 53, and provides a key (decrypted sub-system firm encryption key 25) to the operation unit 5 using an encrypted communication established by the Diffie-Hellman key exchange.

After the sub-system monitor 5M of the operation unit 5 decrypts an encryption area of the sub-system OS 51 and the second communication key 53 using this key (decrypted sub-system firm encryption key 25), the sub-system monitor 5M loads the sub-system OS 51 on the RAM 39, and shifts a control of the operation unit 5 to the sub-system OS 51 (an activation of sub-system OS 51).

The main controller 2 reads out the second communication key 24 (BLOB key) from the non-volatile memory 15. Then, a communication key is generated using the Diffie-Hellman key exchange again for the second communication key 24 and the decrypted second communication key 53 of the operation unit 5, with which encrypted communication can be established.

Compared to a conventional authenticity verification process using TPM, an encrypted communication between the main controller 2 (main system) and the operation unit 5 (sub-system) may be established using two or double communication keys (first communication keys 23 and 54, and second communication keys 24 and 53), and a portion of the sub-system OS 51 and the second communication key 53 in the operation unit 5 are encrypted and stored in the non-volatile memory 38.

Authenticity of the sub-system firm encryption key 25 used for decrypting the sub-system OS 51 and the second communication key 53 is verified by the TPM 14, and then provided to the operation unit 5, by which an intrusion by one device spoofing as the operation unit 5 can be reliably prevented, and security of information stored in a main apparatus of the multi-functional system 1 can be secured.

As shown in FIG. 8, the first communication key 23, the sub-system firm encryption key 25, and the second communication key 24 used as BLOB key in the main controller 2, and the sub-system OS 51 and the second communication key 53 in the operation unit 5 have dependence relationship with respect to the system monitor 2M, the system OS 21, and the sub-system monitor 5M as shown by arrows in FIG. 8.

Further, in FIG. 8, solid-line arrows and dotted-line arrows indicate dependence relationship between a module such as system monitor 2M, system OS 21, and sub-system monitor 5M, and BLOB keys in PCR register, and a long-dashed double-dotted line indicates a relationship of encryption area of the sub-system OS 51 and the second communication key 53 and sub-system firm encryption key. Among such dependence relationship, dependence relationship indicated by the dotted-line arrow and long dashed double-dotted line may be implemented by an encrypted communication as above described.

Further, the first communication key 54 of the operation unit 5 is stored in a given area of the non-volatile memory 38, which cannot be re-written easily, by which falsification can be prevented. The first communication key 23 of the main controller 2 depends on the system monitor 2M and the system OS 21, and the first communication key 23 can be decrypted only with a correct combination of the system monitor 2M and the system OS 21.

Accordingly, when an encrypted communication is established by the Diffie-Hellman key exchange between the first communication key 23 and the first communication key 54, authenticity of the system OS 21 and the system monitor 2M of the main controller 2 can be verified.

Further, the sub-system firm encryption key 25 is a BLOB key. If a hash value of the sub-system monitor 5M, communicated on an encrypted communication by the first communication keys 23 and 54, is not correct, there is a dependence relationship that the sub-system firm encryption key 25 (or BLOB key) cannot be decrypted. Accordingly, when the sub-system firm encryption key 25 (BLOB key) can be decrypted, authenticity of the sub-system monitor 5M is verified.

Further, a portion of the sub-system OS 51 and the second communication key 53 can be decrypted by the sub-system firm encryption key 25. Because the second communication key 24 (BLOB key) of the main controller 2 depends on a hash value of the sub-system OS 51, when the second communication key 24 (BLOB key) can be decrypted, authenticity of the sub-system OS 51 is verified. Further, by establishing an encrypted communication using the second communication keys 24 and 53 thereafter, authenticity of the second communication key 24 of the main controller 2 and the second communication key 53 of the operation unit 5 can be verified.

In the above described example embodiment, the sub-system OS 51 and the second communication key 53 are encrypted, and the sub-system firm encryption key 25 is a BLOB key, by which when falsification is attempted for only the operation unit 5, an encrypted communication using the second communication keys 24 and 53 cannot be initiated at least. Accordingly, important data such as user data stored in the main controller 2 can be effectively protected from a spoofing of sub-system such as the operation unit 5, and falsification and information leak by spoofing can be effectively and reliably prevented.

一元化横取り

As for the multi-functional system 1, the TPM 14 is installed in the main controller 2 but not installed in the sub-system such as operation unit 5, and thereby the TPM 14 of the main controller 2 conducts an authenticity verification process, and the TPM 14 of the main controller 2 centrally controls root of trust for authenticity. Accordingly, an intrusion by spoofing as the sub-system such operation unit 5, can be effectively prevented, and if another system is disposed with a communication path, an attack called as main-in-the-middle attack can be effectively prevented, wherein the main-in-the-middle attack intercepts communications between the systems.

Further, in the above described multi-functional system 1, communication keys are prepared for two stages such as the first communication keys 23/54 and the second communication keys 24/53, but the communication keys (public keys) can be set in multiple stages. For example, as similar to the sub-system OS 51, a file system and application image used by OS can be encrypted with a third communication key and a fourth communication key, and the third communication key and the fourth communication key can be stored in the non-volatile memory 15 of the main controller 2 as BLOB keys. With such a configuration, authenticity of file system and application image can be secured, and security of system can be enhanced further.

As above described, the multi-functional system 1 includes a main system and a plurality of sub-systems detachably connected to the main system. The main system may include the main controller 2, and the plurality of sub-systems may be the engine unit 3, the facsimile unit 4, and the operation unit 5 detachably connected to the main system via a communication device such as PCIe 6 and USB 7. The TPM 14, which is a security chip to protect authenticity of public key used for an encrypted communication between the main controller 2 and the operation unit 5 (sub-system), is installed to the main controller 2.

Further, as for the multi-functional system 1, in the operation unit 5, a portion of the sub-system OS 51, which is a sub-program of the operation unit 5, and the second public key 53 are encrypted and stored in the non-volatile memory 38. The TPM 14 of the main controller 2 checks authenticity of the first public key 54 transmitted from the operation unit 5, which is transmitted for the first time at the time of activation. If an encrypted communication by sharing keys is established, the sub-system firm encryption key 25 is transmitted to the operation unit 5 using the encrypted communication, then the operation unit 5 decrypts the encrypted portion of the sub-system OS 51 and the encrypted second public key 53 using the sub-system firm encryption key 25. And thereafter, the main controller 2 and the operation unit 5 can establish an encrypted communication by sharing keys.

Accordingly, an intrusion to the main controller 2 by spoofing as a sub-system such as operation unit 5 can be reliably prevented, and a breach of security of system such as information theft, falsification by spoofing can be effectively and reliably prevented.

Further, as for the multi-functional system 1, the operation unit 5 includes the sub-system monitor 5M, and a hash value of the sub-system monitor 5M and a hash value of the sub-system OS 51 after decryption are transmitted to the main controller 2, and the main controller 2 stores the first public key 23, the sub-system firm encryption key 25, and the second public key 24 to the non-volatile memory 15 as BLOB key (encrypted key).

If the TPM 14 confirms authenticity of a hash value of the sub-system monitor 5M transmitted from the operation unit 5, the main controller 2 decrypts the encrypted first public key 23. Further, if authenticity of hash value of the sub-system OS 51 is confirmed, the sub-system firm encryption key 25 and the second public key 24 are decrypted and transmitted to the operation unit 5.

Accordingly, a spoofing of the operation unit 5 can be further reliably prevented, and a breach of security of system such as information theft, falsification by spoofing can be further effectively and reliably prevented.

Further, as for the multi-functional system 1, the operation unit 5 stores a portion of program and/or data other than the sub-system OS 51 to the non-volatile memory 38 with encrypted condition, wherein the program and/or data may be executed or used in a given sequential order. The operation unit 5 also stores an encrypted public key with the program and/or data other than the sub-system OS 51, wherein the encrypted public key is used for an encrypted communication with the main controller 2 after decrypting the program and/or data other than the sub-system OS 51. The operation unit 5 establishes an encrypted communication with the main controller 2 by using the decrypted public key, and the main controller 2 stores an encryption key to decrypt encrypted program and/or data other than the sub-system OS 51 and public key in the operation unit 5, and also stores a public key for establishing an encrypted communication with the operation unit 5 by sharing the public key stored in the operation unit 5 and the public key in the main controller 2.

If authenticity of the public key received from the operation unit 5 is verified by the TPM 14, the public key in the non-volatile memory 15 is transmitted to the operation unit 5, and then an encrypted communication between the main controller 2 and the operation unit 5 can be established by sharing the public key.

With such a configuration, authenticity of the sub-system OS 51 installed in the operation unit 5 can be secured, and furthermore authenticity of main programs and/or data can be secured, by which security of system can be further enhanced.

Further, in the above-described multi-functional system 1, the operation unit 5 is detachably connected to the main controller 2 (main system) via the USB 7 as a sub-system.

With the above-described configuration, an intrusion to the system by spoofing the operation unit 5, easily detachably connected to the main controller 2, can be reliably prevented, by which security of system can be enhanced.

The above described example configuration can be applied to a multi-functional apparatus, which prevents an intrusion to a main system by a device spoofing as the sub-system, a multi-functional system configured with a main system such as copier and a plurality of the sub-systems, a security method, a security program, and a storage medium. Further, the above described flowchart processes shown in each drawing can be prepared as a computer-readable program, which can be executed by a CPU of information processing apparatus. Such a program can be stored in a storage medium such as a semiconductor storage unit, an optical storage, a magnetic storage, or the like. Further, such a program and storage medium can be used in system, which may be different from the above-described example embodiments, and by executing the program using a CPU of system, an effect similar to the above-described example embodiments can be devised. As such, in the above-described exemplary embodiments, a computer can be used with a computer-readable program to control functional units used for an information processing system or apparatus. For example, a particular computer may control the information processing apparatus using a computer-readable program, which can execute the above-described processes or steps. Further, in the above-described exemplary embodiments, a storage device (or recording medium), which can store computer-readable program, may be a flexible disk, a CD-ROM (compact disk read only memory), DVD (digital versatile disk), a memory card, a memory chip, or the like, but not limited these. Further, a computer-readable program can be downloaded to a particular computer (e.g., personal computer) via a network, or a computer-readable program can be installed to a particular computer from the above-mentioned storage device, by which the particular computer may be used for the information processing system or apparatus according to example embodiments, for example.

With the above-described configuration, attacks to the security of system by spoofing as the sub-system can be prevented, and security of system can be secured. Such configuration can be applied to a multi-functional system having a main system and a sub-system, and a security method, a security program, and a storage medium.

Numerous additional modifications and variations are possible in light of the above teachings. It is therefore to be understood that within the scope of the appended claims, the disclosure of the present invention may be practiced otherwise than as specifically described herein. For example, elements and/or features of different examples and illustrative embodiments may be combined each other and/or substituted for each other within the scope of this disclosure and appended claims.

What is claimed is:

1. A multi-functional apparatus, comprising:
a main system unit; and
a plurality of subsystem units under control of the main system unit, each of the plurality of subsystem units detachably connected to the main system unit inside the multi-functional apparatus,
each of the plurality of subsystem units including:
a first non-volatile memory configured to store a first subsystem public key to be used for encrypted communication with the main system unit disposed inside the multi-functional apparatus after activation for the first time, and configured to store a sub-program having a given encrypted portion and a second subsystem public key, the second subsystem public key encrypted and used for encrypted communication with the main system unit disposed inside the multi-function apparatus after establishing initial encrypted communication with the main system unit;
a first communication controller configured to transmit the first subsystem public key, stored in the first non-volatile memory of the sub-system unit, to the main system unit to establish encrypted communication with the main system unit by sharing the first subsystem public key;

a decryption unit to decrypt the sub-program having the encrypted portion and the encrypted second subsystem public key stored in the first non-volatile memory by using main system encryption key received from the main system unit; and a second communication controller configured to transmit the second subsystem public key decrypted by the decryption unit to the main system unit to establish encrypted communication with the main system unit by sharing the second subsystem public key, the main system unit including:

a second non-volatile memory configured to store a first main system public key to be used for encrypted communication with the sub-system unit disposed inside the multi-function apparatus and configured to store the main system encryption key to decrypt the encrypted sub-program and the encrypted second subsystem public key in the sub-system unit and a second main system public key of the main system unit to be used for encrypted communication with the sub-system unit;

a security device to protect authenticity of the first main system public key stored in the second non-volatile memory, to protect authenticity of the main system encryption key and the second main system public key stored in the second non-volatile memory, and to protect authenticity of the first subsystem public key and the second subsystem public key received from the sub-system unit;

a third communication controller configured to transmit the first main system public key stored in the second non-volatile memory to the sub-system unit when the authenticity of the first subsystem public key received from the sub-system unit is secured by the security device, the third communication controller establishing encrypted communication with the sub-system unit by sharing the first main system public key of the main system unit and then transmitting the main system encryption key to the sub-system unit; and a fourth controller configured to transmit the second main system public key stored in the second non-volatile memory to the sub-system unit when the authenticity of the second subsystem public key received from the sub-system is secured by the security device, the fourth communication controller establishing encrypted communication with the sub-system unit by sharing the second main system public key.

2. The multi-functional system of claim 1, wherein each of the sub-system units includes a sub-system monitor, in the sub-system unit,
the first communication controller and the second communication controller transmit a hash value of the sub-system monitor and a hash value of the sub-program to the main system unit after decrypting the sub-program, in the main system,
the first second non-volatile memory stores the encrypted first main system public key, and the encrypted main system encryption key and the encrypted second main system public key,
when the security device confirms authenticity of the hash value of the sub-system monitor transmitted from the sub-system unit, the security device decrypts the encrypted first main system public key, and
when the security device further confirms authenticity of the hash value of the sub-program, the security device decrypts the encrypted main system encryption key and the encrypted second main system public key.

3. The multi-functional system of claim 1, wherein, in each the sub-system unit,
the first non-volatile memory stores program and/or data other than the sub-program with encrypting a portion of the program and/or data, and the sub-system unit installs and executes the program and/or data in a given order,
in addition to the program and/or data, the first non-volatile memory also stores the second subsystem public key, which is encrypted, to be used for encrypted communication with the main system unit after decrypting the program and/or data, and
the second communication controller establishes an encrypted communication with the main system unit using the second subsystem public key decrypted by the decryption unit, wherein, in the main system,
the second non-volatile memory stores the main system encryption key to decrypt the encrypted program and/or data other than the sub-program and the encrypted second subsystem public key in the sub-system unit, and the second non-volatile memory also stores the second main system public key to establish encrypted communication with the sub system unit by sharing the second main system public key,
the fourth communication controller transmits the second main system public key in the second non-volatile memory of the main system unit to the sub-system unit when authenticity of the second subsystem public key received from the sub-system unit is secured by the security device, and the fourth communication controller establishes encrypted communication with the sub-system unit by sharing the second main system public key.

4. The multi-functional system of claim 1, wherein one of the subsystem units is detachably connected to the main system unit of the multi-functional apparatus using a universal serial bus (USB), and the sub-system unit is an operation unit used to operate the multi-functional system.

5. A security method for a multi-functional apparatus configured with a main system unit and a plurality of subsystem units under control of the main system unit, each of the plurality of subsystem units detachably connected to the main system unit inside the multi-functional apparatus, the method comprising the steps of:

in each sub-system,
performing first communication control establishing encrypted communication with the main system unit disposed inside the multi-functional apparatus by sharing a first subsystem public key by transmitting the first subsystem public key to the main system unit, a first non-volatile memory storing the first subsystem public key to be used for the encrypted communication with the main system unit after initial apparatus activation;

decrypting a sub-program having an encrypted portion and an encrypted second subsystem public key using a main system encryption key received from the main system unit, the first non-volatile memory storing the sub-program, having encrypted the given portion of the sub-program, and the second subsystem public key encrypted and used for encrypted communication with the main system unit after establishing initial encrypted communication with the main system unit;

performing second communication control establishing encrypted communication with the main system unit by sharing the second subsystem public key by transmitting the second subsystem public key decrypted at the decrypting step to the main system unit;

in the main system,
performing security processing to protect authenticity of a first main system public key stored in the first non-volatile memory in the main system unit, wherein the first main system public key is used to establish encrypted communication with the sub-system unit, to protect authenticity of the main system encryption key, stored in a second non-volatile memory of the main system unit, to decrypt the encrypted sub-program and the encrypted second subsystem public key in the sub-system unit, to protect authenticity of a second main system public key, stored in the second non-volatile memory of the main system unit, the second main system public key of the main system unit establishing an encrypted communication with the sub-system unit by sharing the second main system public key of the main system unit and the second subsystem public key of the sub-system unit, and to protect authenticity of the first subsystem public key and the second subsystem public key received from the sub-system unit;
performing third communication control transmitting the first main system public key stored in the second non-volatile memory of the main system unit to the sub-system unit when authenticity of the first subsystem public key received from the sub-system unit is secured by the security processing step, the first third communication control establishing encrypted communication with the sub-system unit by sharing the first main system public key and then transmitting the main system encryption key to the sub-system unit; and
performing fourth communication control transmitting the second main system public key stored in the second non-volatile memory of the main system unit to the sub-system unit when authenticity of the second sub-system public key received from the sub-system unit is secured by the security process step, the fourth communication control establishing encrypted communication with the sub-system unit by sharing the second main system public key.

6. A non-transitory computer-readable medium storing a security program comprising instructions that when executed by a computer cause the computer to execute a security method for a multi-functional apparatus configured with a main system unit and a plurality of subsystem units under control of the main system unit, each of the plurality of subsystem units detachably connected to the main system unit inside the multi-functional apparatus, the method comprising the steps of:

in each sub-system,
performing first communication control establishing encrypted communication with the main system unit disposed inside the multi-functional apparatus by sharing a first subsystem public key by transmitting the first subsystem public key to the main system unit, a first non-volatile memory storing the first subsystem public key to be used for the encrypted communication with the main system unit after initial apparatus activation;
decrypting a sub-program having an encrypted portion and an encrypted second subsystem public key using a main system encryption key received from the main system unit, the first non-volatile memory storing the sub-program, having encrypted the given portion of the sub-program, and the second subsystem public key encrypted and used for encrypted communication with the main system unit after establishing initial encrypted communication with the main system unit;
performing second communication control establishing encrypted communication with the main system unit by sharing the second subsystem public key by transmitting the second subsystem public key decrypted at the decrypting step to the main system unit;

in the main system,
performing security processing to protect authenticity of a first main system public key stored in the first non-volatile memory in the main system unit, wherein the first main system public key is used to establish encrypted communication with the sub-system unit to protect authenticity of the main system encryption key, stored in a second non-volatile memory of the main system unit, to decrypt the encrypted sub-program and the encrypted second subsystem public key in the sub-system unit, to protect authenticity of a second main system public key, stored in the second non-volatile memory of the main system unit, the second main system public key of the main system unit establishing an encrypted communication with the sub-system unit by sharing the second main system public key of the main system unit and the second subsystem public key of the sub-system unit, and to protect authenticity of the first subsystem public key and the second subsystem public key received from the sub-system unit;
performing third communication control transmitting the first main system public key stored in the second non-volatile memory of the main system unit to the sub-system unit when authenticity of the first subsystem public key received from the sub-system unit is secured by the security processing step, the third communication control establishing encrypted communication with the sub-system unit by sharing the first main system public key and then transmitting the main system encryption key to the sub-system unit; and
performing fourth communication control transmitting the second main system public key stored in the second non-volatile memory of the main system unit to the sub-system unit when authenticity of the second sub-system public key received from the sub-system unit is secured by the security process step, the fourth communication control establishing encrypted communication with the sub-system unit by sharing the second main system public key.

* * * * *